United States Patent Office

3,041,318
Patented June 26, 1962

3,041,318
PROCESS FOR RECOVERING WATER SOLUBLE POLYMERS
Irwin H. Hess, White Plains, N.Y., assignor to American Cyanamid Company, New York, N.Y., a corporation of Maine
No Drawing. Filed Oct. 1, 1957, Ser. No. 687,591
20 Claims. (Cl. 260—80)

This invention relates to a process for recovering water-soluble polymers of a polymerizable compound containing a $CH_2=C<$ group from an aqueous dispersion thereof comprising emulsifying said aqueous dispersion to form a water-in-oil emulsion, and thereafter blending the emulsion thoroughly with a precipitating agent in order to precipitate the polymer therefrom as discrete particles. Still further, this invention relates to a process for removing water-soluble polymers from aqueous dispersions thereof, comprising emulsifying the aqueous dispersions to form a water-in-oil emulsion and blending the emulsion with a precipitating agent, which is a non-solvent, for the polymer, in order to precipitate out the polymer as discrete particles and recovering the precipitated polymer.

One of the objects of the present invention is to recover water-soluble polymeric materials from aqueous dispersions thereof, in the form of fine discrete particles. A further object of the present invention is to treat an aqueous solution or dispersion of a water-soluble polymer with an emulsifying agent so as to produce a water-in-oil emulsion and blending the emulsion thus prepared thoroughly with a precipitating agent in an amount sufficient to precipitate the polymer as fine discrete particles and separating the solid precipitated polymer from the residual fluid and drying the separated polymer. These and other objects of the present invention will be discussed in greater detail hereinbelow.

In the manufacture of water-soluble polymeric materials, such as polyacrylamide, the polymerization of a vinylidene compound such as acrylamide is carried out in an aqueous medium. Oftentimes, the concentration of monomer in solution before polymerization is relatively small in the order of magnitude of about 5%–20%. After polymerization is substantially completed, the water-soluble polymer remains in solution but it is not present in a very substantial concentration. It is commercially inefficient and undesirable to try to remove said water-soluble polymer from its aqueous medium by conventional means such as simple distillation. On the other hand, such aqueous solutions of the polymeric material are not easily handleable especially for shipping purposes inasmuch as sizeable quantities of water such as 90%–95% may well have to be shipped in order to transmit 5 to 10% of the polymeric material. It is then obviously desirable to find a suitable means for removing the polymeric material from its aqueous medium in such a way as to produce a dry solid polymeric material which is substantially free of water and which is in the form of small discrete particles. It is known that water-soluble polymeric materials can be removed from aqueous solution by introducing the same into a precipitating agent. When the viscosity of the aqueous solution or dispersion of the polymeric material is relatively high, the introduction of such viscous solution into a precipitating agent results in the precipitation of large agglomerates which are not desirable commercially. I have found that aqueous solutions or dispersions of water-soluble polymeric materials can be emulsified to form water-in-oil emulsions which are then treated with a precipitating agent in an amount sufficient to precipitate the polymer from the emulsion as discrete particles, thereafter separating the solid precipitated polymer from the residual fluid and drying the seaparated polymer.

In the practice of this process, the precipitating agent is a material which is at least partially soluble in water, inert to the polymer and in which the polymer is substantially insoluble. Still further, the precipitating agent must be one which when dissolved in water, the aqueous solution thus formed is a non-solvent for said polymer at a concentration up to and including the saturation point of the precipitating agent in water. In saying that the precipitating agent must be inert to said polymeric material, it is indicated that the precipitating agent does not enter into any reaction with said polymeric material, nor does it alter its chemical properties in any way. The precipitating agent may be miscible with water or only partly soluble therein. If the precipitating agent has only a limited solubility in water, the aqueous solution of said precipitating agent prior to complete saturation or at most upon complete saturation of the precipitating agent in water, prior to the formation of a 2-phase system should be a non-solvent for the polymeric material, and as a consequence, the polymeric material must precipitate out of the water-in-oil emulsion at some point prior to the formation of a 2-phase system between the water and the partially soluble precipitating agent. The aqueous solution of the polymeric material at the outset would generally be a viscous solution. In preparing the water-in-oil emulsion, one would introduce the aqueous dispersion of the polymeric material into an immiscible organic solvent, that is, a solvent which is immiscible with water, and in which the polymer itself is insoluble. This blend of the water dispersion of the water-soluble polymer and the immiscible organic solvent is then emulsified by using any of the conventional emulsifying agents used to prepare water-in-oil emulsions.

The emulsifying agents that may be used in the practice of the process of the present invention may be described as those which are substantially completely insoluble in water, such as those which have no dispersibility in water or those that have poor dispersibility in water or at best those that form a milky dispersion in water after vigorous agitation. Those skilled in the art will readily recognize this class of emulsifying agent, which are fundamentally non-ionic in character, although to some extent those which are slightly cationic or slightly anionic may be used provided that they be fundamentally considered to be non-ionic. Sometimes these emulsifying agents are evaluated on the basis of their hydrophiliclyophilic balance, sometimes referred to for the sake of brevity as the HLB range, or value. The HLB values are described in considerable detail in a publication appearing in the official digest published by the Federation of Paint and Varnish Production Clubs for June of 1956, written by W. C. Griffin entitled "Clues to Surfactant Selection Offered by the HLB System." Methods for the determination of HLB values are recited and descriptions of the materials in the various ranges set forth. As a rule, emulsifying agents which have an HLB range between 1 and 8 may be used, preferably those having an HLB range between 1 and 4. Reference is made further to an article by the same W. C. Griffin, entitled "Calculation of HLB Values of Non-Ionic Surfactants," printed in the Journal of the Society of Cosmetic Chemists, vol. V, No. 4, December 1954. In the latter publication, a plurality of emulsifying agents are set forth, together with ionic classification and their HLB values. Illustrative of the emulsifying agents which may be used in the practice of the process of the present invention are sorbitan trioleates, polyoxyethylene sorbitol beeswax derivative, sorbitan tristearate, polyoxyethylene sorbitol hexastearate, ethylene glycol fatty acid ester, propylene glycol fatty acid ester, propylene glycol monostearate, sorbitan sesquioleate, polyoxyethylene sorbitol 4.5 oleate, glycerol monostearate, sorbitan monooleate, propylene glycol monolaurate, diethylene glycol monooleate, diethylene glycol monostearate, diethylene glycol monolaurate, sorbitan monopalmitate, polyoxyethylene dioleate, tetraethylene glycol monostearate, tetraethylene glycol monooleate, polyoxypropylene mannitol dioleate, polyoxyethylene sorbitol lanolin oleate derivative, polyoxyethylene sorbitol lanolin derivative, polyoxypropylene stearate and the like. These emulsifying agents should be used in amounts sufficient to permit the preparation of a fairly stable water-in-oil emulsion. It is not imperative that the water-in-oil emulsion prepared be stable over prolonged periods of time, inasmuch as the emulsion thus prepared will be subjected to treatment by the precipitating agent shortly after the emulsion has been prepared. As a consequence, it can readily be seen that a water-in-oil emulsion that is stable for a period of time up to an hour or beyond would be sufficient for the purposes of the present invention. In order to accomplish this fairly stable water-in-oil emulsion, one would use conventional amounts of the emulsifying agents, although said agent may be used over a broad range, such as between about 1% and about 20% by weight, based on the total weight of the organic phase of the emulsion. Preferably, one would use between about 1.5% and about 10% by weight of the emulsifying agent based on the total weight fo the organic phase.

In preparing the water-in-oil emulsions using the emulsifying agents recited hereinabove and the aqueous solutions of the water-soluble polymeric materials, one makes use of an immiscible organic material in which the polymeric material is also insoluble. In this category there are a plurality of materials normally referred to as organic solvents which may be used as the oil phase in the water-in-oil emulsions to be prepared. Included in the group are such materials as benzene, toluene, xylene, high boiling aliphatic petroleum hydrocarbons, benzyl ether, decahydro naphthalene, diamyl benzene, diamyl naphthalene, dibenzyl 1,1-diphenyl ethane, mineral spirits, phenyl ether, isopropyl benzene, kerosene and the like. The amount of the aqueous solution of polymer present in the system based on the total weight of said aqueous solution of polymer and organic phase may be varied between about 40% by weight and about 75%. Preferably, one would use the aqueous solution of the polymeric material in preponderant amounts, namely from about 50% by weight to about 60% by weight of the aqueous solution of the polymer based on the total weight of said aqueous solution and the organic phase. Amounts below 40% and an excess of 75% may be used in certain isolated instances, depending upon the choice of the particular organic phase, but only insomuch as the quantity used does not interfere with the establishment of the fairly stable water-in-oil emulsion.

Among the water-soluble polymers in aqueous solution which may be treated in accordance with the process of the present invention are polymers and copolymers of acrylamide, acrylic acid, and salts thereof, such as sodium acrylate, potassium acrylate, lithium acrylate, ammonium acrylate, and the like; polymers containing vinyl alcohol, vinyl sulphonate units and salts thereof and the like. When these polymeric materials are prepared as homopolymers or as copolymers with one another, the resulting polymeric material is water-soluble. When these monomeric materials are copolymerized with other polymerizable compounds containing a $CH_2=C<$ group, water-soluble polymers are produced when substantial quantities of the former materials are used. Illustrative of polymerizable monomers which may be used with the monomers set forth hereinabove but in less than major amounts of the total copolymer are styrene, ring-substituted alkyl styrenes such as orthomethyl styrene, metamethyl styrene, paramethylstyrene, 2,4-dimethyl styrene, 2,5-dimethyl styrene, 3,4-dimethyl styrene, or the higher monoalkyl or polyalkyl ring-substituted styrenes including the ethyl, propyl, butyl and the like. Additionally, one can make use of the nitriles such as acrylonitrile, methacrylonitrile, ethacrylonitrile, alphachloro acrylonitrile and the like. Still further, one can make use of the esters of acrylic acids such as methyl acrylate, ethyl acrylate, butyl acrylate, methylmethacrylate, ethylmethacrylate and the like. Still further, one could make use of the ring-substituted halostyrenes, such as ortho, meta or para chlorostyrene, 2,4-dichlorostyrene, 2,5-dichlorostyrene and the like. It should be remembered that the use of these latter monomers, namely, the styrenes, the nitriles, the acrylate esters and the like, when used to form copolymers with the acrylamides, acrylic acids and salts thereof and the like, should be used in minor amounts so as not to produce water-insoluble polymers. If the polymer produced is water-insoluble, the present invention is not applicable thereto.

As these polymeric materials are initially prepared, the solution thereof on completion of polymerization is generally hot. The hot solution may be treated immediately if desired or it may be permitted to cool, or may be cooled to room temperature before carrying out the process of the present invention. The temperature at which the emulsion is prepared is not critical.

The process of the present invention is applicable to aqueous solutions of water-soluble polymers having a molecular weight varying over a fairly wide range. For instance, it is applicable to polymers having molecular weight between about 50,000 and 5,000,000 wherein the molecular weight of the higher polymers is a weight average molecular weight. When using polymeric materials having higher molecular weights such as those between about 100,000 and 5,000,000 or even higher, the weight average molecular can be determined by the light scattering method. Cf. P. J. Flory, Principles of Polymer Chemistry, Cornell University Press, 1953, pages 256–316. In determining the molecular weight of lower polymers, the osmotic pressure method may be used. Polymers having molecular weight below 50,000 can readily be treated by the process of the present invention down to and including dimers of the polymerizable monomers.

The concentration of the polymer in the aqueous solution may vary over a fairly wide range depending upon the concentration of the monomer in solution as prepared. This range may vary between about 1% and 80% by weight based on the total weight of solution. For most practical purposes, this inventive concept will be applicable to polymeric solutions having a concentration between about 10 and 20% by weight based on the total weight of solution.

After the water-in-oil emulsion has been prepared, the addition of the precipitating agent can be accomplished and the temperature at which this is carried out is not critical. One may operate at temperatures between about 0° C. and just under the boiling point of the precipitating agent and/or the organic phase and/or the aqueous phase, whichever is lower. Preferably, however, and for economic reasons, it is more desirable to operate between about 10° C. and 60° C. in the addition of the precipitating agent. During the preparation of the emulsion and during the addition of the precipitating agent, it is desirable that there be at least some measure of agitation in order that a homogeneous fairly stable emulsion may be prepared, and in order that the precipitating agent may have the opportunity to precipitate the polymeric material from the water-in-oil emulsion. This agitation can be accomplished by the use of conventional blenders or stirring equipment, centrifugal pumps, colloid mills, homogenizers and the like. Since subatmospheric pressure and superatmospheric pressure is unnecessary in carrying out the process of the present invention, conventional atmospheric pressure is generally recommended.

Among the precipitating agents which may be used in the practice of the process of the present invention are the ketones such as acetone, methylethyl ketone, diethyl ketone, or the aliphatic monohydric alcohols such as methanol, ethanol, propanol, isopropanol and the like, or the ethers such as dimethyl ether, methylethyl ether, diethyl ether and the like, dioxane, morpholine, the glycol mono and/or diethers, such as ethylene glycol monoethyl ether, ethylene glycol monobutyl ether, ethylene glycol monomethyl ether, diethylene glycol monoethyl ether, ethylene glycol diethyl ether, diethylene glycol dimethyl ether, or the glycol ether esters such as ethylene glycol monomethylether acetate and the like. Esters like ethyl acetate may be used.

After the polymeric material has been precipitated out of solution, any conventional mechanical means may be used to separate the precipitated polymer from the residual fluid comprising the solvent in which the polymer was once dissolved and the precipitating agent in which the polymer is insoluble. One can use such mechanical means as filtering, decanting or centrifuging.

After the precipitated polymeric material has been mechanically separated from its residual fluid, the polymeric material may be washed with additional quantities of the precipitating agent and oven-dried or dried in a hot air heater or a drying kiln.

In order that the concept of the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims. These examples are carried out at room temperature unless otherwise indicated.

Example 1

20 parts/minute of a 12½% aqueous solution of polyacrylamide, having a Brookfield viscosity of 30,000 centipoises at 25° C. are emulsified with 8 parts/minute of a 5% solution of sorbitan monooleate in xylene. This emulsion is fed continuously into a suitable reaction vessel equipped with stirrer and thermometer. There is then introduced into a vessel 60 parts/minute of methanol. The pH is maintained between 3 and 4 by the addition of a suitable quantity of nitric acid. The temperature in the precipitation vessel is varied between about 35–40° C. The polymer is separated from the mother liquor by pumping it through a continuous centrifuge. The polymer is then washed in methanol and dried in a vacuum kiln in order to remove the residual methanol.

Example 2

50 parts/hour of a 8% aqueous solution of polyacrylamide having a weight average molecular weight of 2,000,000 is fed continuously into a colloid mill along with 16 parts/hour of a 6% solution of sorbitan monooleate in xylene. The resulting emulsion is fed continuously into an agitated vessel whereupon 70 parts/hour of methanol and a small amount of concentrated nitric acid are introduced in order to adjust the pH to 3–4. The temperature in the precipitation vessel is approximately 30° C. The slurry from the precipitation vessel is pumped into a continuous liquid-solid centrifuge in order to remove the mother liquor. The solid polyacrylamide from the centrifuge is washed in fresh methanol in order to remove any residual water. Following this, the polyacrylamide is centrifuged in a basket centrifuge to remove the bulk of the methanol and then dried in a steam oven at 80° C. for one hour.

Example 3

Equal quantities of a 4% solution of sorbitan monooleate in xylene and a 10% aqueous solution of polyacrylamide are fed continuously into a colloid mill and a water-in-oil emulsion is formed. 1 part of this emulsion is then mixed with 8 parts of diethylene glycol monoethyl ether. The procedure in Example 1 is then followed.

Example 4

Equal quantities of a 1.9% solution of sorbitan trioleate in xylene and a 10% aqueous solution of polyacrylamide are fed into a colloid mill until a water-in-oil emulsion is formed. The emulsion thus prepared is then mixed with methanol in a ratio of 4 parts of methanol to 1 part of emulsion. The polyacrylamide precipitate is then recovered by filtering it from the slurry.

Example 5

1.5 parts of a 8% solution of polyacrylamide in water is emulsified with 1 part of a 1.7% solution of sorbitan monooleate in xylene. The resulting water-in-oil emulsion is then mixed with methanol in a ratio of 2 parts of methanol per part of emulsion. The resulting slurry is filtered to remove the solid polyacrylamide as fine discrete particles.

Example 6

Equal quantities of a 3% solution of the reaction product of tall oil fatty acids reacted with triethanol amine in xylene and a 10% aqueous solution of polyacrylamide are fed continuously to a colloid mill and a water-in-oil emulsion is formed. 1 part of this emulsion is then mixed with 10 parts of methanol and the polyacrylamide is precipitated. The slurry thus formed was filtered to recover the solid polyacrylamide. This process is carried out at approximately room temperature.

Example 7

A 2½% solution of the reaction product of tall oil fatty acids reacted with triethanol amine are introduced into 100 parts of toluene. This mixture is then emulsified with 109 parts of an 8% aqueous solution of polyacrylamide. The water-in-oil emulsion is then mixed with 2,000 parts of acetone. The slurry is filtered to recover the solid polymer.

Example 8

36 parts/hour of a 20% aqueous solution of a copolymer of 9 parts of acrylamide and 1 part of acrylic acid are emulsified continuously with 18 parts/hour of a 6% solution of sorbitan monooleate in xylene. This emulsion is fed continuously into an agitated vessel along with 86.4 parts/hour of methanol. The resulting slurry is pumped into a continuous centrifuge to separate the solid polymer from the mother liquor. The temperature in the centrifuge is approximately 38° C. The polymer is washed in fresh methanol and then centrifuged and oven dried to remove the residual methanol.

Example 9

36 parts/hour of a 20% aqueous solution of a copolymer of 9 parts of acrylamide and 1 part of acrylic acid are emulsified continuously with 12 parts/hour of a 6% solution of sorbitan monooleate in xylene. This emulsion is fed continuously into an agitated tank along with 72 parts/hour of methanol. 18 parts/hour of a 20% aqueous solution of NaCl is added as an electrolytic salting-out agent. The polymer is separated from the mother liquor by centrifuging. The temperature in the precipitation tank is approximately 47° C.

Example 10

A water-in-oil emulsion is prepared with 2 parts of a 20% aqueous solution of a copolymer of 9 parts of acrylamide and 1 part of acrylic acid and 1 part of a 6% solution of sorbitan monooleate in xylene. 84 parts of this emulsion is mixed with 100 parts of methanol and the polymer is precipitated and recovered by filtration. A sufficient amount of an alkali material such as sodium hydroxide may be added to the emulsion or to the water-soluble copolymer if desired in order to convert the carboxyl groups from the acrylic acid to alkali metal salt groups.

Example 11

40 parts/hour of a 20% aqueous solution of a copolymer of 9 parts of acrylamide and 1 part of acrylic acid are fed continuously into a colloid mill along with 20 parts/hour of a 6% solution of sorbitan monooleate in xylene. The resulting emulsion is fed into an agitated vessel along with 128 parts/hour of methanol and sufficient nitric acid to adjust the pH to 3–4. The slurry is pumped to a continuous centrifuge to remove the mother liquor. The solid polymer is washed with fresh methanol, centrifuged to remove the bulk of the methanol and then oven dried at 80° C. to remove the residual methanol. The temperature in the precipitation tank is approximately 40° C.

Example 12

156 parts of benzene are mixed with 3.9 parts of the reaction product of ethanolamide of tall oil fatty acids and ethylene oxide. This solution is emulsified with 300 parts of a 20% aqueous solution of a copolymer of 9 parts of acrylamide and 1 part of acrylic acid. The emulsion is then mixed with 2,000 parts of denatured ethyl alcohol. The solid polymer is then recovered by centrifuging the slurry.

Example 13

200 parts of toluene containing dissolved therein 5 parts of the reaction product of tall oil fatty acids ethanolamide with ethylene oxide are emulsified with 222 parts of a 20% solution of a copolymer of 9 parts of acrylamide and 1 part of acrylic acid. The resulting emulsion is poured slowly into an agitated baffled stainless steel vessel containing 2,000 parts of acetone. The precipitated polymer is recovered by filtration.

Example 14

1 part of a 10% aqueous solution of polyvinyl alcohol is emulsified with 0.5 part of a 5% solution of sorbitan monooleate in xylene. The resulting water-in-oil emulsion is mixed with 4 parts of methanol to precipitate the polymer. Filtration, washing and drying produces a dry particulate polymer.

Example 15

1 part of a 10% aqueous solution of polyvinyl alcohol is emulsified with an equal amount of a 4% solution of the reaction product of tall oil fatty acids and triethanol amine in toluene. The resulting emulsion is mixed with 3.5 parts of acetone to precipitate the polymer. The procedure outlined hereinabove is then followed to recover the dry polymeric material.

Example 16

1 part of a 15% solution of sodium polyacrylate is emulsified with 0.4 part of a 4% solution of sorbitan trioleate in xylene. The resulting water-in-oil emulsion is mixed with 2 parts of acetone to precipitate the polymer. Filtration, washing, and drying follows to recover the dry particulate polymer.

Example 17

1 part of a 10% aqueous solution of a copolymer of 96 parts of acrylamide and 4 parts of diallyl dimethyl ammonium chloride is emulsified in 0.5 part of a 5% solution of sorbitan monooleate in xylene. The resulting emulsion is mixed with 4 parts of methanol to precipitate the polymer.

Example 18

1 part of a 10% aqueous solution of a copolymer of 9 parts of acrylamide and 1 part of acrylic acid is emulsified in 0.5 part of a 4% solution of sorbitan monooleate in toluene. The resulting water-in-oil emulsion is mixed with 3 parts of 2-B alcohol to precipitate the polymer. The resulting precipitate is dried after washing.

I claim:

1. A process for removing a water-soluble polymer of a polymerizable compound containing a $CH_2=C<$ group from an aqueous dispersion thereof comprising emulsifying said aqueous dispersion in the presence of a water immiscible organic material to form a water-in-oil emulsion of said aqueous dispersion, wherein the oil phase is a liquid, water-immiscible, organic material in which said polymer is insoluble, blending said emulsion thoroughly with a liquid organic precipitating agent in an amount sufficient to precipitate the polymer as discrete particles, separating the solid precipitated polymer from the residual fluid and drying the separated polymer, wherein said precipitating agent is at least partially soluble in water, inert to said polymer and in which said polymer is substantially insoluble, wherein an aqueous solution of said precipitating agent is a non-solvent for said polymer at a concentration up to and including saturation and wherein said water immiscible organic material is characterized as one in which said polymer is insoluble.

2. A process for removing a water-soluble polymer of acrylamide from an aqueous dispersion thereof comprising emulsifying said aqueous dispersion in the presence of a water immiscible organic material to form a water-in-oil emulsion of said aqueous dispersion, wherein the oil phase is a liquid, water-immiscible, organic material in which said polymer is insoluble, blending said emulsion thoroughly with a liquid organic precipitating agent in an amount sufficient to precipitate the polymer as discrete particles, separating the solid precipitated polymer from the residual fluid and drying the separated polymer, wherein said precipitating agent is at least partially soluble in water, inert to said polymer and in which said polymer is substantially insoluble, wherein an aqueous solution of said precipitating agent is a non-solvent for said polymer at a concentration up to and including saturation and wherein said water immiscible organic material is characterized as one in which said polymer is insoluble.

3. A process for removing a water-soluble copolymer of acrylamide and acrylic acid from an aqueous dispersion thereof comprising emulsifying said aqueous dispersion in the presence of a water immiscible organic material to form a water-in-oil emulsion of said aqueous dispersion, wherein the oil phase is a liquid, water-immiscible, organic material in which said polymer is insoluble, blending said emulsion thoroughly with a liquid organic precipitating agent in an amount sufficient to precipitate the polymer as discrete particles, separating the solid precipitated polymer from the residual fluid and drying the separated polymer, wherein said precipitating agent is at least partially soluble in water, inert to said polymer and in which said polymer is substantially insoluble, wherein an aqueous solution of said precipitating agent is a non-solvent for said polymer at a concentration up to and including saturation and wherein said water immiscible organic material is characterized as one in which said polymer is insoluble.

4. A process for removing a water-soluble polymer of methacrylamide from an aqueous dispersion thereof comprising emulsifying said aqueous dispersion in the presence of a water immiscible organic material to form a water-in-oil emulsion, of said aqueous dispersion, wherein the oil phase is a liquid, water-immiscible, organic material in which said polymer is insoluble, blending said emulsion thoroughly with a liquid organic precipitating agent in an amount sufficient to precipitate the polymer as discrete particles, separating the solid precipitated polymer from the residual fluid and drying the separated polymer, wherein said precipitating agent is at least partially soluble in water, inert to said polymer and in which said polymer is substantially insoluble, wherein an aqueous solution of said precipitating agent is a non-solvent for said polymer at a concentration up to and including saturation and wherein said water immiscible organic material is characterized as one in which said polymer is insoluble.

5. A process for removing a water-soluble polymer of a polymerizable compound containing a $CH_2=C<$ group from an aqueous dispersion thereof comprising emulsifying said aqueous dispersion in the presence of a water immiscible organic material to form a water-in-oil emulsion of said aqueous dispersion, wherein the oil phase is a liquid, water-immiscible, organic material in which said polymer is insoluble, blending said emulsion thoroughly with a liquid organic precipitating agent in an amount sufficient to precipitate the polymer as discrete particles, filtering the solid precipitated polymer from the residual fluid and drying the filtered polymer wherein said precipitating agent is at least partially soluble in water, inert to said polymer and in which said polymer is substantially insoluble, wherein an aqueous solution of said precipitating agent is a non-solvent for said polymer at a concentration up to and including saturation and wherein said water immiscible organic material is characterized as one in which said polymer is insoluble.

6. A process for removing a water-soluble polymer of a polymerizable compound containing a $CH_2=C<$ group from an aqueous dispersion thereof comprising emulsifying said aqueous dispersion in the presence of a water immiscible organic material to form a water-in-oil emulsion of said aqueous dispersion, wherein the oil phase is a liquid, water-immiscible, organic material in which said polymer is insoluble, blending said emulsion thoroughly with a liquid organic precipitating agent in an amount sufficient to precipitate the polymer as discrete particles, centrifuging the solid precipitated polymer from the residual fluid and drying the centrifuged polymer wherein said precipitating agent is at least partially soluble in water, inert to said polymer and in which said polymer is substantially insoluble, wherein an aqueous solution of said precipitating agent is a non-solvent for said polymer at a concentration up to and including saturation and wherein said water immiscible organic material is characterized as one in which said polymer is insoluble.

7. A process for removing a water-soluble polymer of acrylamide from an aqueous dispersion thereof comprising emulsifying said aqueous dispersion in the presence of a water immiscible organic material to form a water-in-oil emulsion of said aqueous dispersion, wherein the oil phase is a liquid, water-immiscible, organic material in which said polymer is insoluble, blending said emulsion thoroughly with a liquid organic precipitating agent in an amount sufficient to precipitate the polymer as discrete particles, filtering the solid precipitated polymer from the residual fluid and drying the filtered polymer, wherein said precipitating agent is at least partially soluble in water, inert to said polymer and in which said polymer is substantially insoluble, wherein an aqueous solution of said precipitating agent is a non-solvent for said polymer at a concentration up to and including saturation and wherein said water immiscible organic material is characterized as one in which said polymer is insoluble.

8. A process for removing a water-soluble co-polymer of acrylamide and acrylic acid from an aqueous dispersion thereof comprising emulsifying said aqueous dispersion in the presence of a water immiscible organic material to form a water-in-oil emulsion of said aqueous dispersion, wherein the oil phase is a liquid, water-immiscible, organic material in which said polymer is insoluble, blending said emulsion thoroughly with a liquid organic precipitating agent in an amount sufficient to precipitate the polymer as discrete particles, filtering the solid precipitated polymer from the residual fluid and drying the filtered polymer, wherein said precipitating agent is at least partially soluble in water, inert to said polymer and in which said polymer is substantially insoluble, wherein an aqueous solution of said precipitating agent is a non-solvent for said polymer at a concentration up to and including saturation and wherein said water immiscible organic material is characterized as one in which said polymer is insoluble.

9. A process for removing a water-soluble polymer of methacrylamide from an aqueous dispersion thereof comprising emulsifying said aqueous dispersion in the presence of a water immiscible organic material to form a water-in-oil emulsion of said aqueous dispersion, wherein the oil phase is a liquid, water-immiscible, organic material in which said polymer is insoluble, blending said emulsion thoroughly with a liquid organic precipitating agent in an amount sufficient to precipitate the polymer as discrete particles, filtering the solid precipitated polymer from the residual fluid and drying the filtered polymer, wherein said precipitating agent is at least partially soluble in water, inert to said polymer and in which said polymer is substantially insoluble, wherein an aqueous solution of said precipitating agent is a non-solvent for said polymer at a concentration up to and including saturation and wherein said water immiscible organic material is characterized as one in which said polymer is insoluble.

10. A process for removing a water-soluble, acetone-insoluble polymer of a polymerizable compound containing a $CH_2=C<$ group from an aqueous dispersion thereof comprising emulsifying said aqueous dispersion in the presence of a water immiscible organic material to form a water-in-oil emulsion of said aqueous dispersion, wherein the oil phase is a liquid, water-immiscible, organic material in which said polymer is insoluble, blending said emulsion thoroughly with acetone in an amount sufficient to precipitate the polymer as discrete particles, separating the solid precipitated polymer from the residual fluid and drying the separated polymer and wherein said water immiscible organic material is characterized as one in which said polymer is insoluble.

11. A process for removing a water-soluble, methanol-insoluble polymer of a polymerizable compound containing a $CH_2=C<$ group from an aqueous dispersion thereof comprising emulsifying said aqueous dispersion in the presence of a water immiscible organic material to form a water-in-oil emulsion of said aqueous dispersion, wherein the oil phase is a liquid, water-immiscible, organic material in which said polymer is insoluble, blending said emulsion thoroughly with methanol in an amount sufficient to precipitate the polymer as discrete particles, separating the solid precipitated polymer from the residual fluid and drying the separated polymer and wherein said water immiscible organic material is characterized as one in which said polymer is insoluble.

12. A process for removing a water-soluble, acetone-insoluble polymer of acrylamide from an aqueous dispersion thereof comprising emulsifying said aqueous dispersion in the presence of a water immiscible organic material to form a water-in-oil emulsion of said aqueous dispersion, wherein the oil phase is a liquid, water-immiscible, organic material in which said polymer is insoluble, blending said emulsion thoroughly with acetone in an amount sufficient to precipitate the polymer as discrete particles, separating the solid precipitated polymer from the residual fluid and drying the separated polymer and wherein said water immiscible organic material is characterized as one in which said polymer is insoluble.

13. A process for removing a water-soluble, acetone-insoluble copolymer of acrylamide and acrylic acid from an aqueous dispersion thereof comprising emulsifying said aqueous dispersion in the presence of a water immiscible organic material to form a water-in-oil emulsion of said aqueous dispersion, wherein the oil phase is a liquid, water-immiscible, organic material in which said polymer is insoluble, blending said emulsion thoroughly with acetone in an amount sufficient to precipitate the polymer as discrete particles, separating the solid precipitated polymer from the residual fluid and drying the separated polymer and wherein said water immiscible organic material is characterized as one in which said polymer is insoluble.

14. A process for removing a water-soluble, acetone-insoluble polymer of methacrylamide from an aqueous dispersion thereof comprising emulsifying said aqueous dispersion in the presence of a water immiscible organic material to form a water-in-oil emulsion of said aqueous dispersion, wherein the oil phase is a liquid, water-immiscible, organic material in which said polymer is insoluble, blending said emulsion thoroughly with acetone in an amount sufficient to precipitate the polymer as discrete particles, separating the solid precipitated polymer from the residual fluid and drying the separated polymer and wherein said water immiscible organic material is characterized as one in which said polymer is insoluble.

15. A process for removing a water-soluble, methanol-insoluble polymer of acrylamide from an aqueous dispersion thereof comprising emulsifying said aqueous dispersion in the presence of a water immiscible organic material to form a water-in-oil emulsion of said aqueous dispersion, wherein the oil phase is a liquid, water-immiscible, organic material in which said polymer is insoluble, blending said emulsion thoroughly with methanol in an amount sufficient to precipitate the polymer as discrete particles, separating the solid precipitated polymer from the residual fluid and drying the separated polymer and wherein said water immiscible organic material is characterized as one in which said polymer is insoluble.

16. A process for removing a water-soluble, methanol-insoluble copolymer of acrylamide and acrylic acid from an aqueous dispersion thereof comprising emulsifying said aqueous dispersion in the presence of a water immiscible organic material to form a water-in-oil emulsion of said aqueous dispersion, wherein the oil phase is a liquid, water-immiscible, organic material in which said polymer is insoluble, blending said emulsion thoroughly with methanol in an amount sufficient to precipitate the polymer as discrete particles, separating the solid precipitated polymer from the residual fluid and drying the separated polymer and wherein said water immiscible organic material is characterized as one in which said polymer is insoluble.

17. A process for removing a water-soluble, methanol-insoluble polymer of methacrylamide from an aqueous dispersion thereof comprising emulsifying said aqueous dispersion in the presence of a water immiscible organic material to form a water-in-oil emulsion of said aqueous dispersion, wherein the oil phase is a liquid, water-immiscible, organic material in which said polymer is insoluble, blending said emulsion thoroughly with methanol in an amount sufficient to precipitate the polymer as discrete particles, separating the solid precipitated polymer from the residual fluid and drying the separated polymer and wherein said water immiscible organic material is characterized as one in which said polymer is insoluble.

18. A process for removing a water-soluble, acetone-insoluble polymer of acrylamide from an aqueous dispersion thereof comprising emulsifying said aqueous dispersion in the presence of a water immiscible organic material to form a water-in-oil emulsion of said aqueous dispersion, wherein the oil phase is a liquid, water-immiscible, organic material in which said polymer is insoluble, blending said emulsion thoroughly with acetone in an amount sufficient to precipitate the polymer as discrete particles, filtering the solid precipitated polymer from the residual fluid and drying the filtered polymer and wherein said water immiscible organic material is characterized as one in which said polymer is insoluble.

19. A process for removing a water-soluble, acetone-insoluble copolymer of acrylamide and acrylic acid from an aqueous dispersion thereof comprising emulsifying said aqueous dispersion in the presence of a water immiscible organic material to form a water-in-oil emulsion of said aqueous dispersion, wherein the oil phase is a liquid, water-immiscible, organic material in which said polymer is insoluble, blending said emulsion thoroughly with acetone in an amount sufficient to precipitate the polymer as discrete particles, filtering the solid precipitated polymer from the residual fluid and drying the filtered polymer and wherein said water immiscible organic material is characterized as one in which said polymer is insoluble.

20. A process for removing a water-soluble polymer of methacrylamide from an aqueous dispersion thereof comprising emulsifying said aqueous dispersion in the presence of a water immiscible organic material to form a water-in-oil emulsion of said aqueous dispersion, wherein the oil phase is a liquid, water-immiscible, organic material in which said polymer is insoluble, blending said emulsion thoroughly with acetone in an amount sufficient to precipitate the polymer as discrete particles, filtering the solid precipitated polymer from the residual fluid and drying the filtered polymer and wherein said water immiscible organic material is characterized as one in which said polymer is insoluble.

References Cited in the file of this patent
UNITED STATES PATENTS

| | | |
|---|---|---|
| 1,392,849 | Plauson | Oct. 4, 1921 |
| 2,282,037 | Dahle | May 5, 1942 |
| 2,749,331 | Breslow | June 5, 1956 |
| 2,761,834 | Suen et al. | Sept. 4, 1956 |

UNITED STATES PATENT OFFICE
CERTIFICATE OF CORRECTION

Patent No. 3,041,318 June 26, 1962

Irwin H. Hess

It is hereby certified that error appears in the above numbered patent requiring correction and that the said Letters Patent should read as corrected below.

Column 6, line 62, for "18" read -- 1.8 --.

Signed and sealed this 5th day of February 1963.

(SEAL)
Attest:

ERNEST W. SWIDER
Attesting Officer

DAVID L. LADD
Commissioner of Patents